US008718396B2

(12) United States Patent
Tatsumi

(10) Patent No.: US 8,718,396 B2
(45) Date of Patent: May 6, 2014

(54) IMAGE PROCESSING APPARATUS PERFORMING LUMINANCE CORRECTION AND METHOD OF CONTROLLING THE SAME

(75) Inventor: Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 58 days.

(21) Appl. No.: 12/891,261

(22) Filed: Sep. 27, 2010

(65) Prior Publication Data

US 2011/0097012 A1 Apr. 28, 2011

(30) Foreign Application Priority Data

Oct. 22, 2009 (JP) ................................ 2009-243783

(51) Int. Cl.
*G06K 9/40* (2006.01)

(52) U.S. Cl.
USPC .......................................................... 382/274

(58) Field of Classification Search
None
See application file for complete search history.

(56) References Cited

U.S. PATENT DOCUMENTS

| | | | | |
|---|---|---|---|---|
| 3,699,241 | A * | 10/1972 | Larsen | 348/680 |
| 4,668,975 | A * | 5/1987 | Kuwayama et al. | 348/237 |
| 6,278,445 | B1 | 8/2001 | Tanaka et al. | 345/178 |
| 6,771,320 | B2 * | 8/2004 | Choi | 348/625 |
| 7,260,244 | B2 * | 8/2007 | Shikami et al. | 382/112 |
| 7,428,021 | B2 * | 9/2008 | Fukuda | 348/650 |
| 7,508,541 | B2 * | 3/2009 | Ishiguro | 358/1.9 |
| 7,542,619 | B2 | 6/2009 | Toyooka et al. | 382/260 |
| 7,609,869 | B2 * | 10/2009 | Bernhardt et al. | 382/128 |
| 7,639,287 | B2 * | 12/2009 | Konda et al. | 348/234 |
| 7,711,203 | B2 * | 5/2010 | Wan | 382/260 |
| 7,724,307 | B2 * | 5/2010 | Wan et al. | 348/620 |
| 7,970,234 | B2 * | 6/2011 | Park et al. | 382/275 |
| 8,174,624 | B2 * | 5/2012 | Sakashita | 348/687 |
| 2003/0179945 | A1 * | 9/2003 | Akahori | 382/260 |
| 2005/0259064 | A1 * | 11/2005 | Sugino et al. | 345/102 |
| 2006/0023965 | A1 * | 2/2006 | Kimbell et al. | 382/260 |

(Continued)

FOREIGN PATENT DOCUMENTS

JP 2006-184896 7/2006

OTHER PUBLICATIONS

XP031018371, Hanfeng Chen et al., "Nonlinearity compensated smooth frame insertion for motion-blur reduction in LCD", IEEE 7th Workshop on Multimedia Signal Processing, Oct. 2005, pp. 1-4.

(Continued)

*Primary Examiner* — John Strege
*Assistant Examiner* — Sean Conner
(74) *Attorney, Agent, or Firm* — Fitzpatrick, Cella, Harper & Scinto

(57) ABSTRACT

An image processing apparatus comprises an input unit configured to input image data including m frame images per unit time; a filtering unit configured to generate a high-frequency component emphasized frame image and a low-frequency component frame image from each frame image; a correction unit configured to correct a luminance of the low-frequency component frame image corresponding to each frame image at a predetermined ratio so as to make the image data perceptible in the same brightness as that of each of the frame images output as the m frames per unit time; and an output unit configured to alternately output the high-frequency component emphasized frame image generated by the filtering unit and the low-frequency component frame image whose luminance has been corrected by the correction unit as image data including 2 m frame images per unit time.

8 Claims, 10 Drawing Sheets

(56) References Cited

U.S. PATENT DOCUMENTS

| | | | | |
|---|---|---|---|---|
| 2006/0119617 | A1* | 6/2006 | Toyooka et al. | 345/619 |
| 2006/0164557 | A1* | 7/2006 | Fukuda | 348/650 |
| 2006/0227249 | A1* | 10/2006 | Chen et al. | 348/631 |
| 2007/0003156 | A1* | 1/2007 | Lin et al. | 382/260 |
| 2007/0053607 | A1* | 3/2007 | Mitsunaga | 382/274 |
| 2007/0263121 | A1* | 11/2007 | Take et al. | 348/448 |
| 2008/0002872 | A1* | 1/2008 | Gatesoupe et al. | 382/132 |
| 2008/0284768 | A1* | 11/2008 | Yoshida et al. | 345/208 |
| 2009/0040374 | A1* | 2/2009 | Kobayashi | 348/448 |
| 2009/0040376 | A1* | 2/2009 | Kobayashi | 348/452 |
| 2009/0073192 | A1* | 3/2009 | Kobayashi | 345/643 |
| 2009/0074325 | A1* | 3/2009 | Kameyama | 382/283 |
| 2009/0226110 | A1* | 9/2009 | Chen et al. | 382/263 |
| 2009/0273611 | A1* | 11/2009 | Itokawa et al. | 345/619 |
| 2009/0278786 | A1* | 11/2009 | Chan et al. | 345/102 |
| 2009/0303391 | A1* | 12/2009 | Jung et al. | 348/687 |
| 2010/0013991 | A1* | 1/2010 | Miyazaki et al. | 348/452 |
| 2010/0020230 | A1* | 1/2010 | Suzuki | 348/441 |
| 2010/0098349 | A1* | 4/2010 | Arashima et al. | 382/263 |
| 2010/0118214 | A1* | 5/2010 | Yoshimura | 348/760 |
| 2010/0119150 | A1* | 5/2010 | Kanai | 382/167 |
| 2010/0156772 | A1* | 6/2010 | Arashima et al. | 345/87 |
| 2010/0259675 | A1* | 10/2010 | Kawai | 348/452 |
| 2010/0310191 | A1* | 12/2010 | Sato | 382/276 |
| 2011/0001757 | A1* | 1/2011 | Kerofsky et al. | 345/589 |
| 2011/0019095 | A1* | 1/2011 | He et al. | 348/607 |
| 2011/0234899 | A1* | 9/2011 | Kobayashi | 348/447 |
| 2011/0261293 | A1* | 10/2011 | Kimura | 349/74 |

OTHER PUBLICATIONS

Office action issued on Jul. 6, 2011, in 10186383.5, an EP counterpart of the present application.

* cited by examiner

--Prior Art--

--Prior Art--

IMAGE PROCESSING APPARATUS PERFORMING LUMINANCE CORRECTION AND METHOD OF CONTROLLING THE SAME

BACKGROUND OF THE INVENTION

1. Field of the Invention

The present invention relates to an image processing technique and, more particularly, to image processing when a display device displays a moving image.

2. Description of the Related Art

Moving image display devices represented by a TV set can be classified into hold-type display devices and impulse-type display devices. A hold-type display device continues displaying a single image in one frame interval (1/60 sec when the frame rate is 60 Hz). A liquid crystal display device and organic EL display using TFTs are known as hold-type display devices. On the other hand, an impulse-type display device displays an image only in the scanning interval of one frame interval so the pixel luminances start lowering immediately after the scanning. A CRT (Cathode Ray Tube) and FED (Field-Emission-type Display) are known as impulse-type display devices.

A hold-type display device is known to have a problem that a viewer readily perceives blurs of a moving object displayed on the screen (motion blurring). To cope with the blurs, the hold-type display device raises the driving frequency of its display to shorten the hold time. For example, Japanese Patent Laid-Open No. 2006-184896 discloses a technique (to be referred to as driving distributing hereinafter) which generates two sub frames from one input frame, that is, a sub frame without a high frequency component and a sub frame containing an emphasized high frequency component, and alternately displays two sub frames generated in correspondence with each frame.

On the other hand, an impulse-type display device is more advantageous in moving image visibility than a hold-type display device. However, since the device emits light only instantaneously in each frame interval (1/60 sec when the frame rate is 60 Hz), and repeats light emission at the period of 1/60 sec, a problem of flickering may arise. Flickering is more noticeable on a larger screen, and therefore tends to be a serious problem especially in the recent trend shifting toward display devices with wider screens. The impulse-type display device adopts, as a measure against flickering, a technique of raising the driving frequency of its display.

However, the present inventor found by experiments that when driving distributing raised the frame rate, the sum of waveforms of distributed sub frames and the integration effect by human eye were not always the same. More specifically, it was found that a uniform luminance portion of a frame image sometimes looked as if it changed brightness upon driving distributing.

SUMMARY OF THE INVENTION

The present invention provides a higher-quality display image for a viewer when a display device displays a moving image.

According to one aspect of the present invention, an image processing apparatus comprises: an input unit configured to input image data including m frame images per unit time; a filtering unit configured to generate a high-frequency component emphasized frame image and a low-frequency component frame image from each frame image included in the input image data; a correction unit configured to correct a luminance of the low-frequency component frame image corresponding to each frame image at a predetermined ratio so as to make the image data perceptible in the same brightness as that of each of the frame images output as the m frames per unit time; and an output unit configured to alternately output the high-frequency component emphasized frame image generated by the filtering unit and the low-frequency component frame image whose luminance has been corrected by the correction unit as image data including 2 m frame images per unit time.

According to another aspect of the present invention, a method of controlling an image processing apparatus, comprises the steps of: inputting image data including m frame images per unit time; generating a high-frequency component emphasized frame image and a low-frequency component frame image from each frame image included in the input image data; correcting a luminance of the low-frequency component frame image corresponding to each frame image at a predetermined ratio so as to make the image data perceptible in the same brightness as that of each of the frame images output as the m frames per unit time; and alternately outputting the high-frequency component emphasized frame image generated in the step of generating the high-frequency component emphasized frame image and the low-frequency component frame image whose luminance has been corrected in the step of correcting the luminance as image data including 2 m frame images per unit time.

According to the present invention, it is possible to provide a higher-quality display image for a viewer when a display device displays a moving image.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Preferred embodiments of the present invention will now be described in detail in accordance with the accompanying drawings. Note that the following embodiments are not intended to limit the scope of the invention, but are merely examples.

First Embodiment

As the first embodiment of an image processing apparatus according to the present invention, an image processing apparatus 100 which outputs an image to a panel module 109 serving as a display device will be exemplified below. Note that an example will be explained below in which two sub frames (sub frame images) are generated from each of a plurality of frame images contained in moving image data of 60 frames per sec (60 Hz), and a moving image of 120 frames per sec (120 Hz) is output. The present invention is also applicable to any other input frame rate or output frame rate. Note that in the following description, "frame frequency" indicates the number of frames displayed per sec in progressive scanning, or the number of fields displayed per sec in interlaced scanning.

<Technical Premise>

The display characteristics of the hold-type display device and impulse-type display device described above in "BACKGROUND" will be described in more detail.

Hold-Type Display Device

Figure 7:
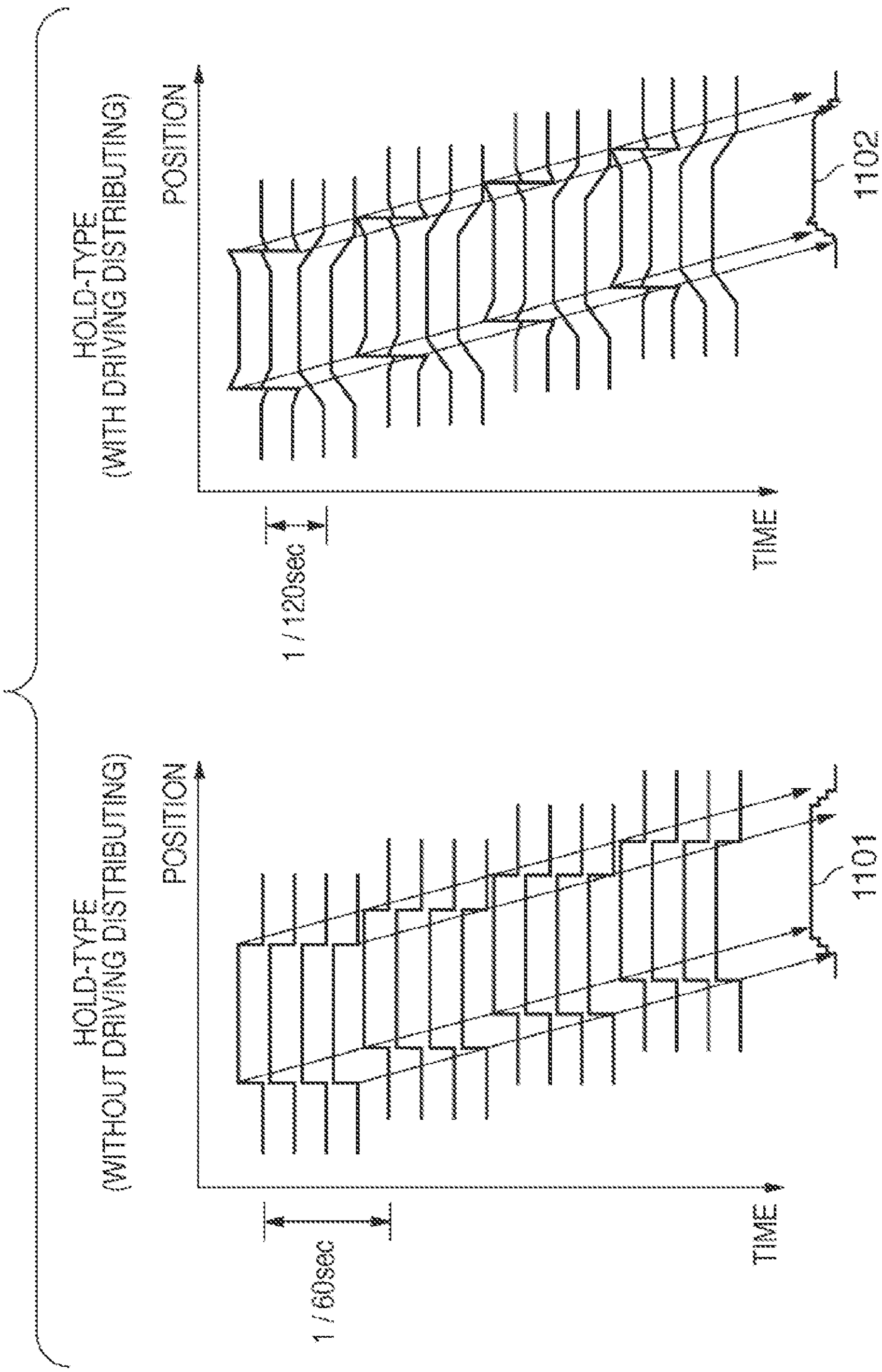
FIG. 7 shows views for explaining the dynamic characteristic of display of a hold-type display device and the dynamic characteristic upon driving distributing.

FIG. 7 shows views for explaining the dynamic characteristic of display of a hold-type display device and the dynamic characteristic upon driving distributing. In FIG. 7, the abscissa represents the position (coordinates) on the display screen, and the ordinate represents time. FIG. 7 shows a state in which an image (for example, a rectangle or a circle) having a uniform brightness is moving from the left to the right of the screen. Note that the rectangular waves shown in FIG. 7 indicate image luminance distributions at the respective timings.

As shown on the left view of FIG. 7, without driving distributing, the image moving from the left to the right of the screen causes blurs (motion blurring) on the hold-type display device. Note that FIG. 7 shows four rectangular waves in each interval of 1/60 sec for the descriptive convenience. In actuality, the image is continuously displayed in the interval of 1/60 sec. When the user's eye tracks the motion of the image, the image stays on the same pixels in the interval of 1/60 sec relative to the motion tracked by the eye so as to generate a relative delay to the motion. If the hold time is long, the delay width increases, and the user perceives it as motion blurring on the screen. A waveform 1101 in FIG. 7 conceptually indicates the way the user tracks the motion without driving distributing. The edges of the waveform 1101 have a moderate staircase shape. As a result, the viewer senses blurs in which the luminance change has a certain width. A waveform 1102 in FIG. 7 conceptually indicates the way the user tracks the motion upon driving distributing. As compared to the waveform 1101, the waveform 1102 have clearer vertical edges. That is, the motion blurring perceived by the viewer is reduced, as can be seen.

Impulse-Type Display Device

Figure 8:
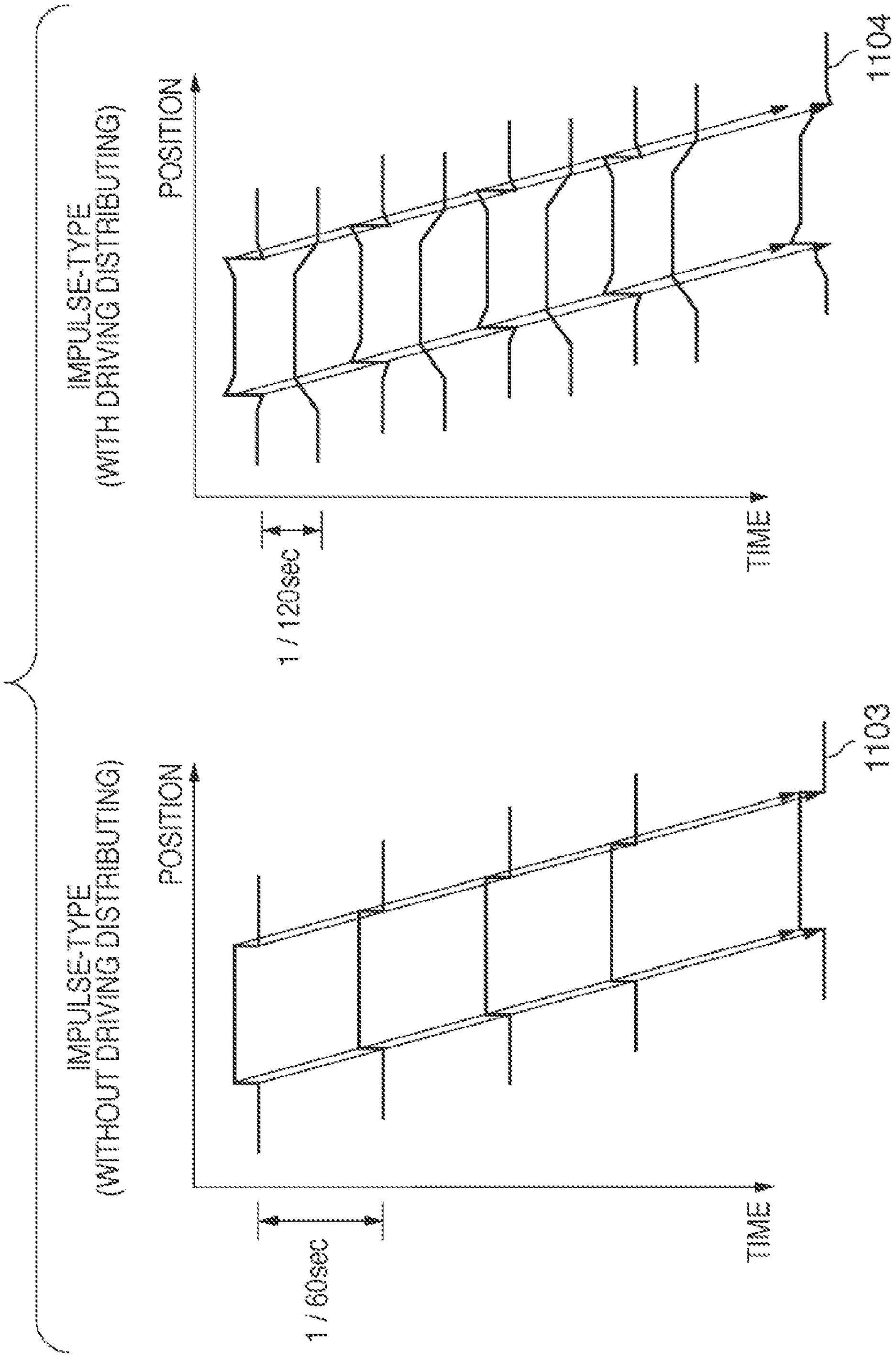
FIG. 8 shows views for explaining the dynamic characteristic of display of an impulse-type display device and the dynamic characteristic upon driving distributing.

FIG. 8 shows views for explaining the dynamic characteristic of display of an impulse-type display device and the dynamic characteristic upon driving distributing. The abscissa and ordinate in FIG. 8 are the same as in FIG. 7. FIG. 8 shows a state in which an image (for example, a rectangle or a circle) having a uniform brightness is moving from the left to the right of the screen. Note that the rectangular waves shown in FIG. 8 indicate image luminance distributions at the respective timings.

As shown on the left view of FIG. 8, the prime characteristic feature is that no motion blurring that generates an afterimage occurs even without driving distributing. A waveform 1103 in FIG. 8 conceptually indicates the way the user tracks the motion without driving distributing. The edges of the waveform 1103 vertically stand, indicating that the viewer senses no blur. A waveform 1104 in FIG. 8 conceptually indicates the way the user tracks the motion when driving distributing is performed as a measure against flickering. As compared to the waveform 1103, the edges of the waveform 1104 are slightly disturbed. However, the viewer perceives very little motion blurring, as can be seen. Note that if the same frame is simply displayed twice instead of performing driving distributing, a double image is generated. However, when the driving distributing method is used, the high frequency component is displayed only once. Although very little blurring is caused by the low frequency component, no double image is generated, and visual degradation is suppressed.

<Arrangement of Apparatus>

Figure 1:
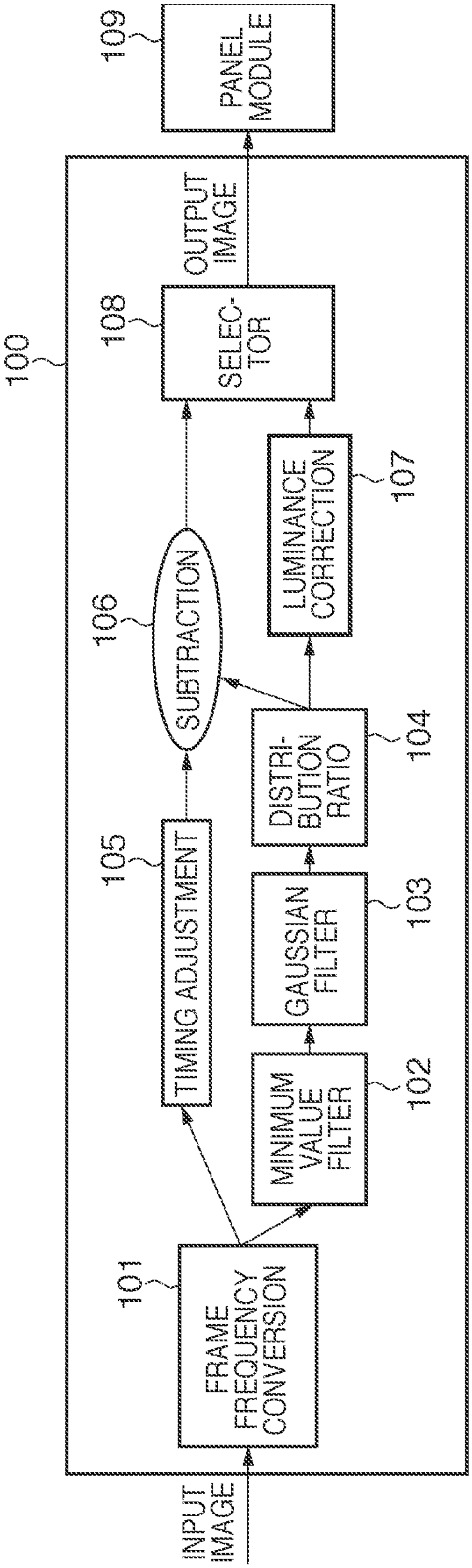
FIG. 1 is a block diagram of an image processing apparatus according to the first embodiment.

FIG. 1 is a block diagram of the image processing apparatus 100 according to the first embodiment. A frame frequency conversion circuit 101 converts the frame frequency of an input original image to a higher frequency. As described above, an example will be explained below in which a moving image of 60 frames per sec (60 Hz) is converted into a moving image of 120 frames per sec (120 Hz). A minimum value filter 102 is configured to substitute the value of a pixel of interest of the input image with the minimum pixel value out of the peripheral pixels around the pixel of interest, and output the image. A Gaussian filter 103 performs softening filter processing using, for example, a Gaussian function for the input image. A distribution ratio circuit 104 multiplies each sub frame image by a gain corresponding to the distribution ratio. A timing adjustment circuit 105 outputs the image output from the frame frequency conversion circuit 101 to a subtraction processing circuit 106 to be described later at a timing adjusted in consideration of the delay of processing from the minimum value filter 102 to the distribution ratio circuit 104. The subtraction processing circuit 106 performs subtraction processing for two images bit by bit, and outputs a "first sub frame". A luminance correction circuit 107 (first correction circuit in claims) multiplies the output from the distribution ratio circuit 104 by a predetermined luminance correction coefficient, and outputs a "second sub frame". A selector circuit 108 (output control means in claims) selectively sequentially outputs the first sub frame and second sub frame. Note that the panel module 109 displays the image output from the selector circuit 108. Note that the second sub frame (low-frequency component frame image) is formed from the low frequency component of the original frame image, as indicated by the fact that it is obtained by processing the original frame image via the Gaussian filter 103. On the other hand, the first sub frame (high-frequency component emphasized frame image) is formed from the high frequency component and low frequency component of the original frame image, as indicated by the fact that it is obtained by the difference between the original frame image and the second sub frame.

<Operation of Apparatus>

Evaluation Experiments

The present inventor conducted evaluation experiments using the circuit arrangement shown in FIG. 1 concerning the dependence of human perceptible brightness on the display frequency. More specifically, two patches, that is, a patch displayed at 60 Hz (to be referred to as "60-Hz display" hereinafter) and a patch displayed at 120 Hz (to be referred to as "120-Hz display" hereinafter) were displayed on the panel module 109, and the brightness was evaluated for four objects.

Note that in the image processing apparatus 100, the minimum value filter 102 is configured to input the same value as the value of the pixel of interest to the entire input region (for example, 5×5 pixel region) of the filter. The softening filter 103 is configured to use "1" as the coefficient for the pixel of interest and "0" as the coefficient for other pixels. The distribution ratio circuit 104 is configured to set the first sub frame to 100% and the second sub frame to 0% for the patch of 60-Hz display, and set the first sub frame to 50% and the second sub frame to 50% for the patch of 120-Hz display. The luminance correction circuit 107 is configured not to perform luminance correction.

Figure 2:
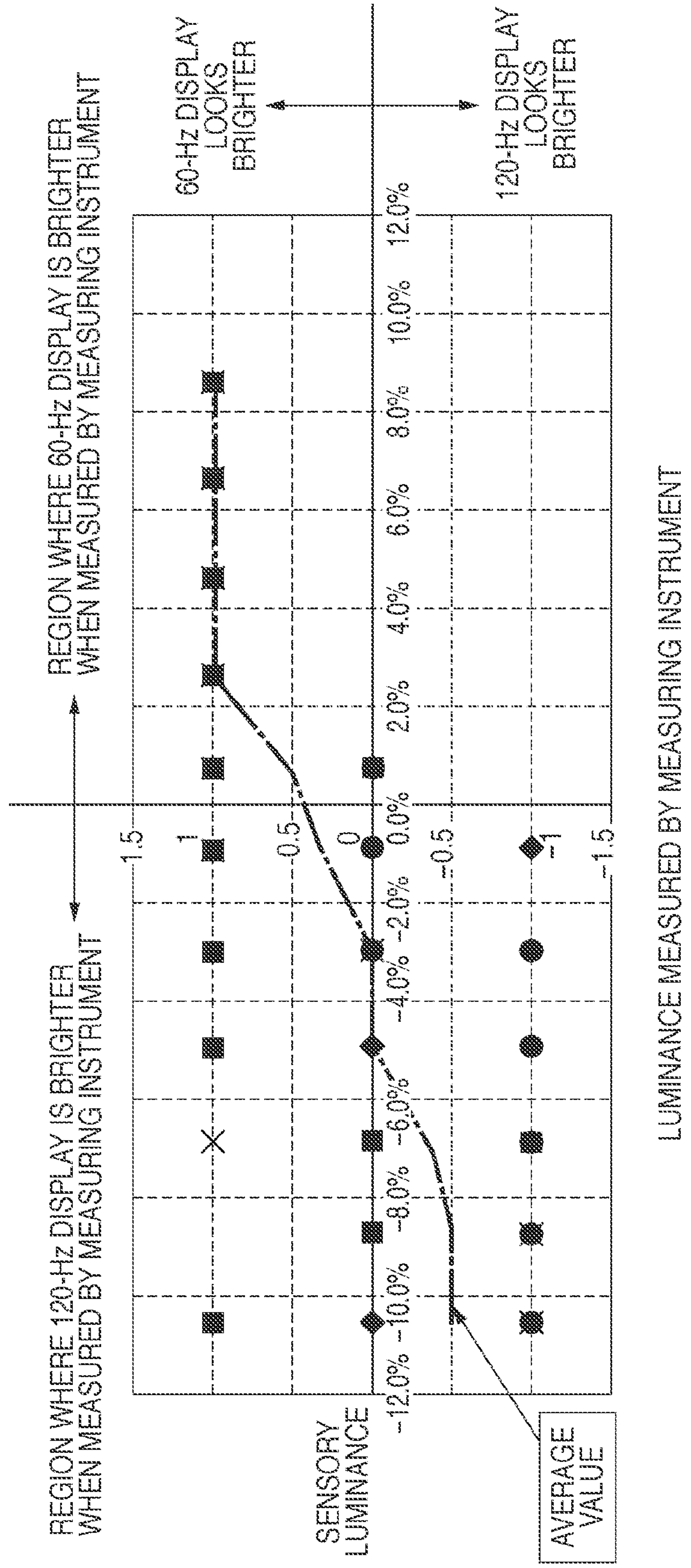
FIG. 2 is a graph showing the result of evaluation of a brightness change perceived by users depending on the driving frequency.

FIG. 2 is a graph showing the result of evaluation of the two patches of 60-Hz display and 120-Hz display by the four objects. The abscissa represents an increase/decrease in the luminance ratio measured by a measuring instrument (luminance meter). The patch of 60-Hz display becomes brighter than that of 120-Hz display toward the right side (forward direction). The ordinate represents the brightness sensed by the objects. More specifically, a point where the patch of 60-Hz display looks brighter is plotted on the upper side (+1). A point where the two patches look in the same brightness is plotted at the center (0). A point where the patch of 120-Hz display looks brighter is plotted on the lower side (−1).

Referring to FIG. 2, the results of the four objects are represented by four symbols, and the average of the four objects is indicated by an alternate long and short dashed line. As is apparent, the alternate long and short dashed line representing the average crosses the center line at X=−4. That is, when measured by the measuring instrument, the image of 60-Hz display that is darkened by 4% looks in the same brightness as the image of 120-Hz display. In other words, luminances are classified into a "measured luminance" measured by a measuring instrument and a "sensory luminance" representing brightness sensed by human eyes, which changes depending on the frequency, as is apparent from the experiments. Note that as can be predicted from FIG. 2, the shift amount of the luminance ratio varies among individuals, and the variation by the individual differences is assumed to fall within the range of about 0% to 10%.

Driving Distributing without Luminance Correction

Figure 3:
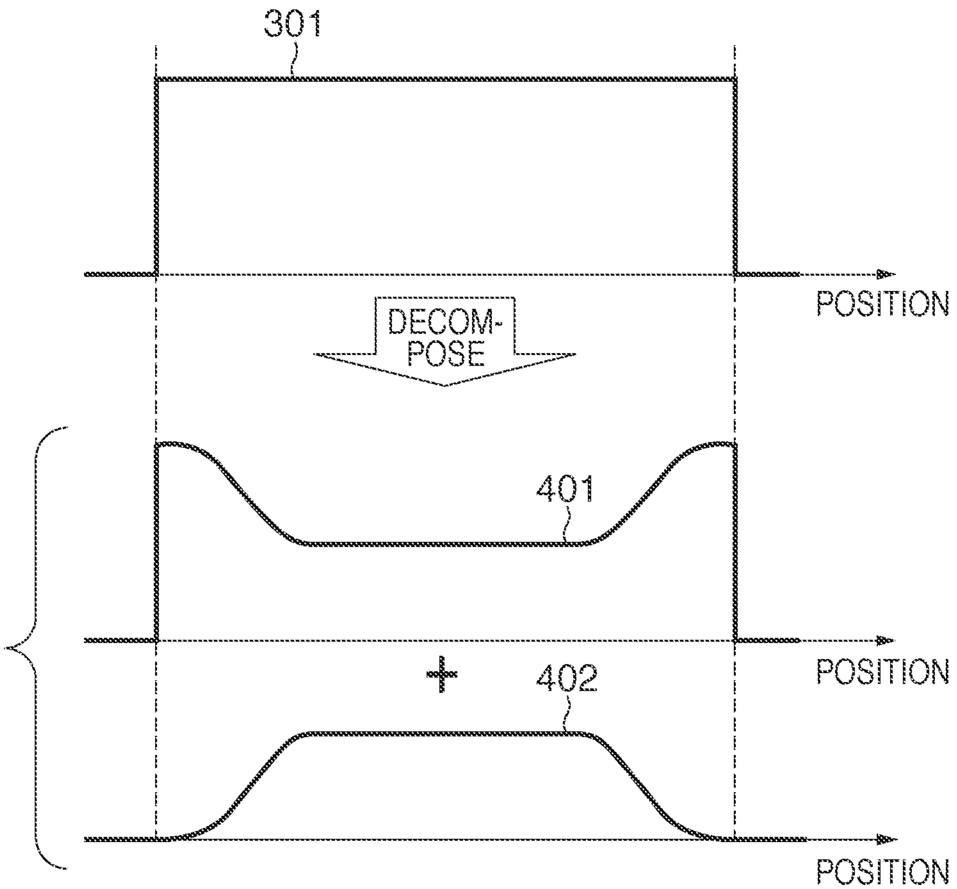
FIG. 3 is a view showing the relationship between an original frame image and two sub frames in driving distributing.

FIG. 3 is a view showing the relationship between an original frame image and two sub frames in driving distributing. FIG. 3 particularly illustrates a case in which the luminance correction coefficient of the luminance correction circuit 107 is set to 1.0 (that is, no luminance correction is performed). The abscissa represents the position on the screen, and the ordinate represents the luminance. A waveform 301 indicates the luminance change (luminance pattern) of the original frame image. A waveform 401 indicates the luminance change of the first sub frame. A waveform 402 indicates the luminance change of the second sub frame.

Figure 4:
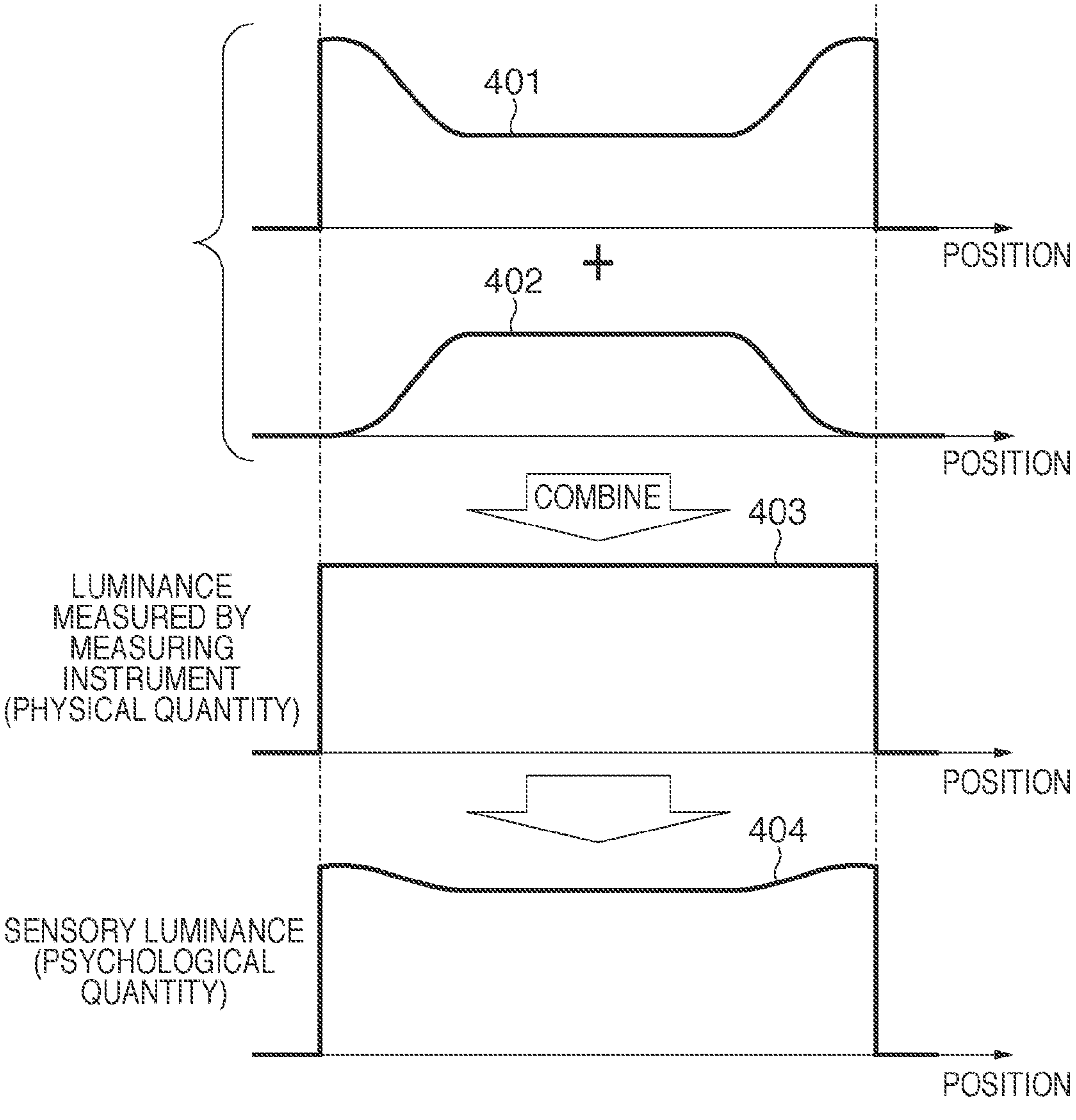
FIG. 4 is a view showing the way the user views the two sub frames shown in FIG. 3 when they are combined.

FIG. 4 is a view showing the luminance (physical quantity) measured by the measuring instrument and the sensory luminance (psychological quantity) when the two sub frames driving-distributed as shown in FIG. 3 are displayed on the panel module 109. The abscissa represents the position on the screen, and the ordinate represents the luminance. More specifically, a waveform 403 indicates the simple sum of the waveform 401 of the first sub frame and the waveform 402 of the second sub frame. A waveform 404 indicates a luminance change sensed by a human, which is derived based on the above-described evaluation experiments.

That is, when the first sub frame (waveform 401) and the second sub frame (waveform 402) are alternately displayed, they are expected to be perceived as the waveform 403. Actually, however, the central portion looks dark, as indicated by the waveform 404. This is because the measured luminance (physical quantity) and the sensory luminance (psychological quantity) are different depending on the display frequency, as shown in FIG. 2.

Figure 5:
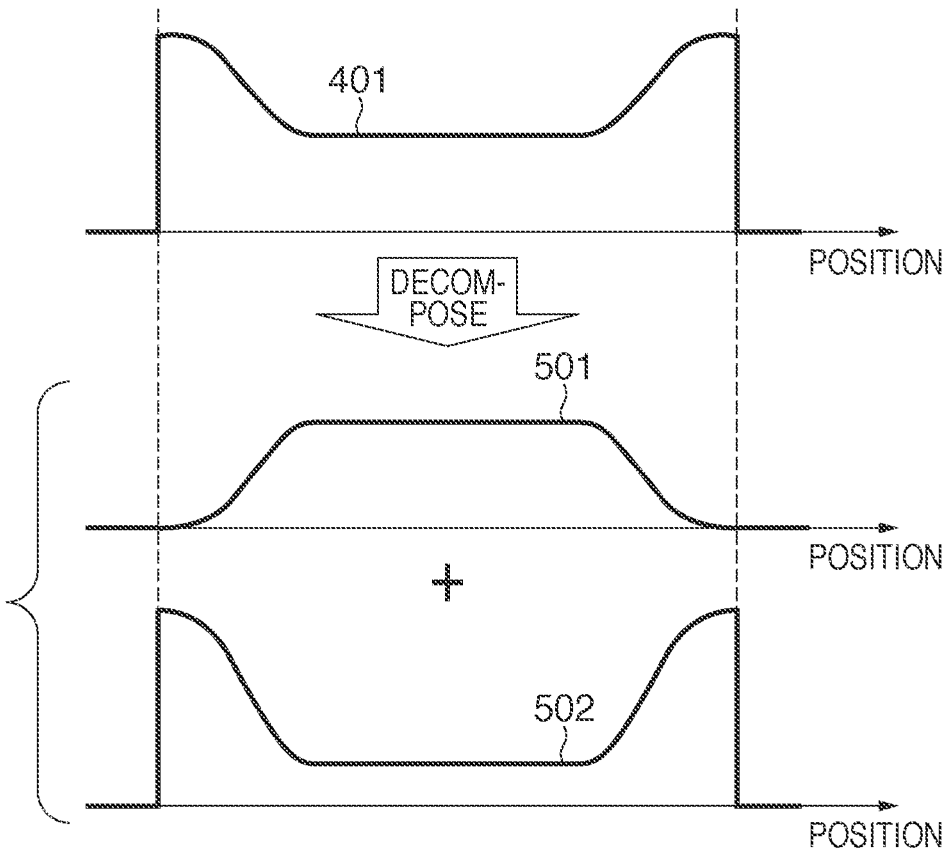
FIG. 5 is a view showing a state in which a sub frame is further decomposed into two sub frames for the descriptive convenience.

This will be explained in more detail with reference to FIG. 5. FIG. 5 is a view showing a state in which a sub frame is further decomposed into two sub frames. The division is done such that a waveform 501 has the same shape as the waveform 402 of the second sub frame, and the remaining part (difference) is represented by a waveform 502. The first sub frame is thus divided into a component which is displayed only once in the two sub frame intervals included in one frame interval (1/60 sec) and a component which is displayed twice. That is, the waveform 501 is the same as the waveform 402 representing the luminance change of the second sub frame, and can therefore be regarded as the component that is displayed twice. On the other hand, the luminance component of the waveform 502 can be regarded as the component that is displayed only once.

As described with reference to FIG. 2, 120-Hz display (corresponding to two-time display) looks darker than 60-Hz display (corresponding to one-time display) by 0% to 10%. Hence, the luminance component of the central portion of the waveform including the waveforms 501 and 402 looks dark. Hence, the central portion looks dark, as indicated by the waveform 404.

Driving Distributing with Luminance Correction

Assume that the luminance correction circuit 107 performs luminance correction (sensory luminance correction) to compensate for the luminance. An example will be described here in which the luminance correction circuit 107 performs +4% luminance correction (the luminance correction coefficient is 1.04) to multiply the luminance of a sub frame corresponding to the "second sub frame" by 1.04.

Figure 6:
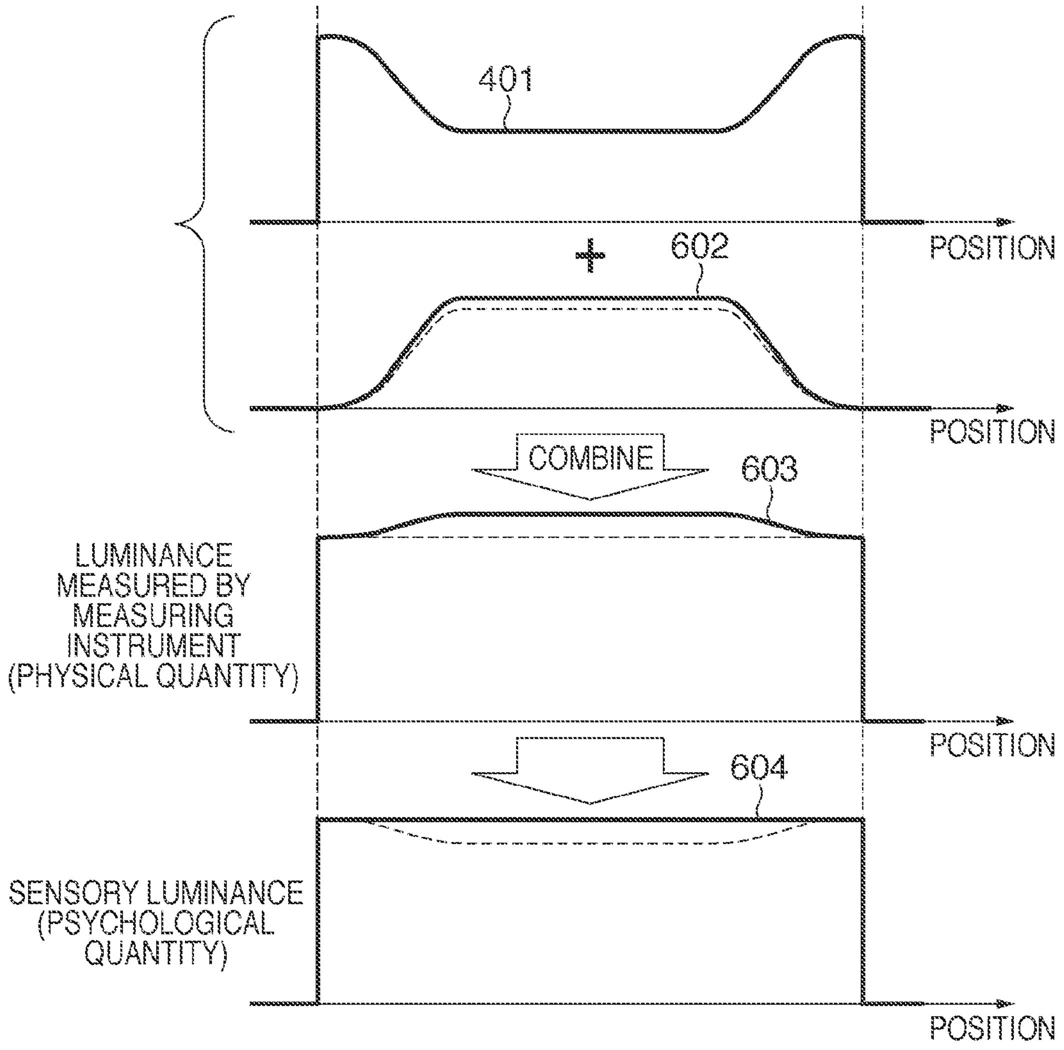
FIG. 6 is a view showing the way the user views sub frames that have undergone luminance correction by the image processing apparatus according to the first embodiment.

FIG. 6 is a view showing the way the user views sub frames that have undergone luminance correction by the image processing apparatus according to the first embodiment. The waveform 401 indicates the luminance change of the first sub frame. A waveform 602 indicates the luminance change of the second sub frame. A waveform 603 indicates the sum of the luminance changes of the first and second sub frames. A waveform 604 indicates the luminance perceived by a human.

Note that the luminance correction circuit 107 makes the luminance of the waveform 602 slightly higher (+4%) than that of the waveform 402 indicated by the dotted line. The luminance obtained as a measured luminance (physical quantity) by combining the waveforms 401 and 602 is higher at the central portion, as indicated by the waveform 603. However, the waveform 604 represented as a sensory luminance (psychological quantity) looks slightly dark at the central portion due to the influence of the above-described luminance change. For this reason, the luminance-corrected portion and the influence of the sensory luminance cancel each other so that a waveform having a uniform brightness like the original frame image can be obtained.

As described above, according to the first embodiment, it is possible to compensate for a decrease in the image luminance caused upon driving distributing while improving the display quality of a moving image on the display unit by driving distributing. This allows to display a higher-quality moving image for the user.

Note that the above-described change in the sensory luminance depending on the display frequency can occur in both the hold-type display device and the impulse-type display device. Hence, the above-described image processing apparatus can obtain the same effect for both the hold-type display device and the impulse-type display device.

Note that although simply correcting a "luminance" has been described above, the processing may be performed for the luminance (Y) component of an image expressed by YCbCr components or for the pixel value of each of the RGB colors (the luminance value of each color) of an RGB image.

Second Embodiment

Figure 9:
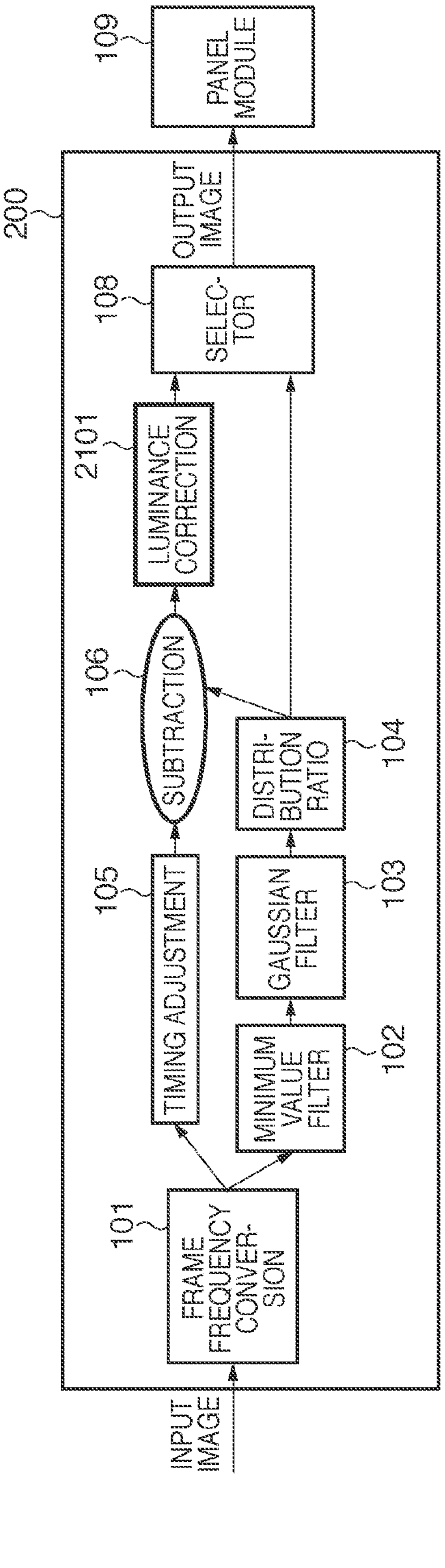
FIG. 9 is a block diagram of an image processing apparatus according to the second embodiment.

FIG. 9 is a block diagram of an image processing apparatus 200 according to the second embodiment. Note that the same reference numerals as in FIG. 1 denote the same or similar functional units in FIG. 9, and a detailed description thereof will not be repeated. In the first embodiment, an example has been described in which correction for improving the luminance is performed for the second sub frame. In the second embodiment, an example will be described in which correction for reducing the luminance is performed for the first sub frame.

A luminance correction circuit 2101 (second correction circuit in claims) performs luminance correction for the output from a subtraction processing circuit 106. Assume that the luminance correction circuit 2101 performs luminance correction (sensory luminance correction) to compensate for the luminance. An example will be described here in which the luminance correction circuit 2101 performs −4% luminance correction (the luminance correction coefficient is 0.96) to multiply the luminance of a sub frame corresponding to the "first sub frame" by 0.96.

Figure 10:
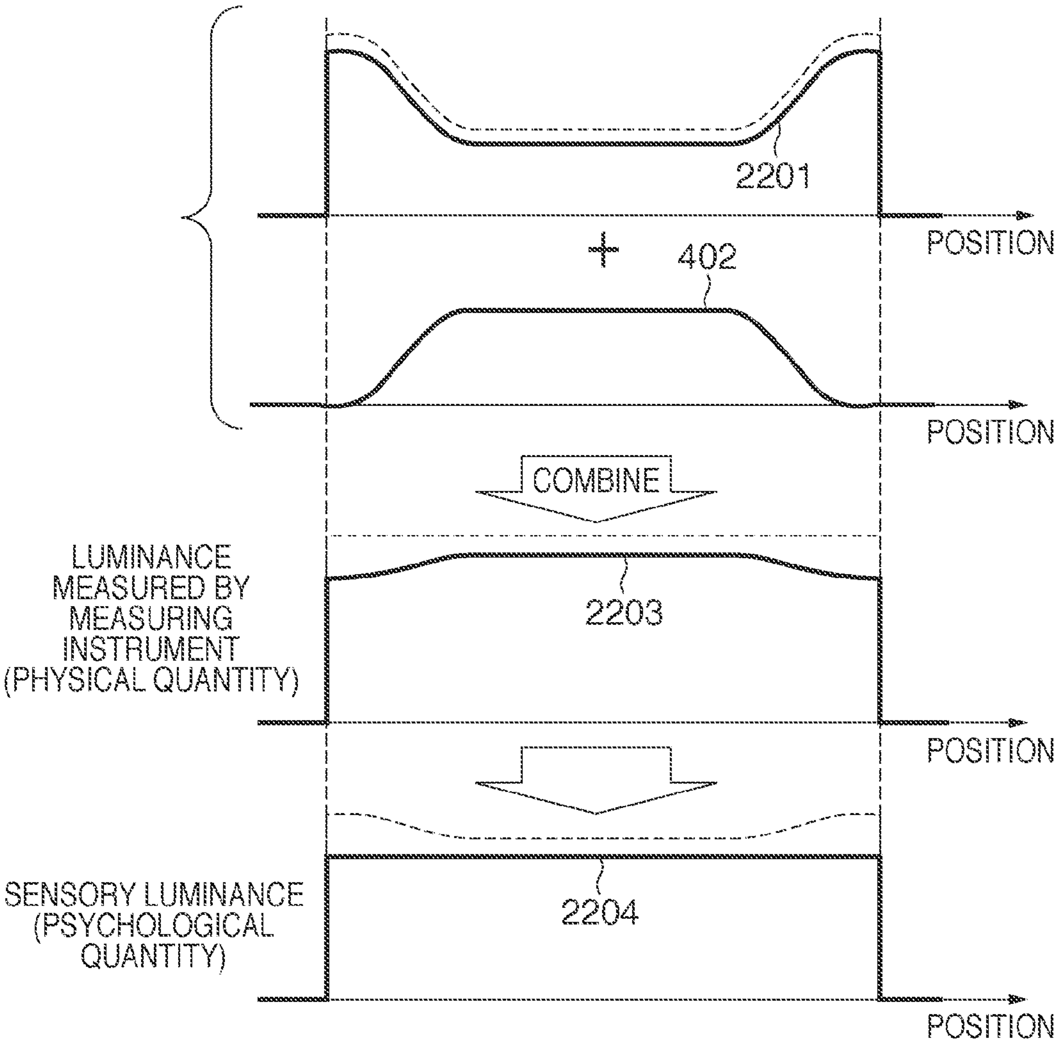
FIG. 10 is a view showing the way the user views sub frames that have undergone luminance correction by the image processing apparatus according to the second embodiment.

FIG. 10 is a view showing the way the user views sub frames that have undergone luminance correction by the image processing apparatus according to the second embodiment. A waveform 2201 indicates the luminance change of the first sub frame. A waveform 402 indicates the luminance change of the second sub frame. A waveform 2203 indicates the sum of the luminance changes of the first and second sub frames. A waveform 2204 indicates the luminance perceived by a human.

Note that the luminance correction circuit 2101 makes the luminance of the waveform 2201 slightly lower (−4%) than that of a waveform 401 indicated by the dotted line. The luminance obtained as a measured luminance (physical quantity) by combining the waveforms 2201 and 402 is higher at the central portion, as indicated by the waveform 2203. However, the sensory luminance (psychological quantity) looks slightly dark at the central portion due to the influence of the above-described luminance change. For this reason, the luminance-corrected portion and the influence of the sensory luminance cancel each other so that the waveform 2204 having a uniform brightness like the original frame image can be obtained.

As described above, according to the second embodiment, it is possible to compensate for a decrease in the image luminance caused upon driving distributing while improving the display quality of a moving image on the display unit by driving distributing. This allows to display a higher-quality moving image for the user.

(Modification)

Note that the above-described first and second embodiments may be combined. More specifically, two luminance correction circuits may be provided to perform luminance correction for both the first sub frame and the second sub frame. For example, assume that an image of 60-Hz display that is darkened by 4% looks in the same brightness as an image of 120-Hz display. In this case, the luminance correction coefficient for the first sub frame is set to 0.98, and that for the second sub frame is set to 1.02.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-243783, filed on Oct. 22, 2009, which is hereby incorporated by reference herein in its entirety.

What is claimed is:

1. An image processing apparatus comprising:

an input unit configured to input image data including m frame images per unit time;

a generating unit configured to generate a high-frequency component emphasized frame image and a low-frequency component frame image from each frame image included in the input image data, wherein the high-frequency component emphasized frame image is generated by subtracting the low-frequency component frame image from the corresponding frame image;

a correction unit configured to correct, for only the low-frequency component frame image, which is generated by said generating unit, a luminance corresponding to each frame image at a predetermined ratio applied to the entire frame so as to make the image data perceptible in the same brightness as that of each of the frame images output as the m frames per unit time; and an output unit configured to alternately output the high-frequency component emphasized frame image generated by said generating unit and the low-frequency component frame image whose luminance has been corrected by said correction unit as image data including 2 m frame images per unit time.

2. The apparatus according to claim 1, wherein said correction unit multiplies the luminance of the low-frequency component frame image by a luminance correction coefficient based on +a % ($0<a<10$) luminance correction.

3. The apparatus according to claim 1, further comprising a minimum value filtering unit configured to substitute a pixel value of each pixel included in the input image data with a minimum pixel value out of pixel values of peripheral pixels around the pixel of interest, wherein said generating unit generates the high-frequency component emphasized frame image and the low-frequency component frame image from each frame image included in the image data processed by said minimum value filtering unit.

4. A method of controlling an image processing apparatus, comprising the steps of:

inputting image data including m frame images per unit time;

generating a high-frequency component emphasized frame image and a low-frequency component frame image from each frame image included in the input image data, wherein the high-frequency component emphasized frame image is generated by subtracting the low-frequency component frame image from the corresponding frame image;

correcting, for only the low-frequency component frame image only, which is generated in said generating step, a luminance corresponding to each frame image at a predetermined ratio applied to the entire frame so as to make the image data perceptible in the same brightness as that of each of the frame images output as the m frames per unit time; and alternately outputting the high-frequency component emphasized frame image generated in said step of generating the high-frequency component emphasized frame image and the low-frequency component frame image whose luminance has been corrected in said step of correcting the luminance as image data including 2 m frame images per unit time.

5. The method according to claim 4, wherein said correction step multiplies the luminance of the low-frequency component frame image by a luminance correction coefficient based on +a % (0<a<10) luminance correction.

6. The method according to claim 4, further comprising minimum value filtering by substituting a pixel value of each pixel included in the input image data with a minimum pixel value out of pixel values of peripheral pixels around the pixel of interest, wherein said generating step generates the high-frequency component emphasized frame image and the low-frequency component frame image from each frame image included in the filtered image data.

7. The image processing apparatus of claim 1, wherein the luminance correction is independent of the image luminance values.

8. The method of controlling an image processing apparatus of claim 4, wherein the luminance correction is independent of the image luminance values.

* * * * *